United States Patent

Heitmann

[15] 3,663,201
[45] May 16, 1972

[54] PROCESS FOR PRODUCTION OF SPONGE IRON

[72] Inventor: Gunter Heitmann, Franfurt am Main-Niederrad, Germany

[73] Assignees: Metallgesellschaft Aktiengesellschaft, Frankfurt, Main, Germany; The Steel Company of Canada Limited, Hamilton, Ontario, Canada

[22] Filed: Nov. 17, 1969

[21] Appl. No.: 871,681

Related U.S. Application Data

[63] Continuation of Ser. No. 525,452, Feb. 7, 1966, abandoned.

[30] Foreign Application Priority Data

Feb. 5, 1965 Germany..................M 64055

[52] U.S. Cl...................................................75/33, 75/36
[51] Int. Cl. ................................................C21b 13/08
[58] Field of Search..........................................75/33, 36

[56] References Cited

UNITED STATES PATENTS

| | | | |
|---|---|---|---|
| 2,112,566 | 3/1938 | Hasselbach | 75/36 |
| 2,900,248 | 8/1959 | Johannsen | 75/36 |
| 2,986,457 | 5/1961 | Jones | 75/33 X |
| 3,215,188 | 11/1965 | Paulencu | 431/174 |
| 3,235,375 | 2/1966 | Meyer et al. | 75/36 X |
| 1,735,463 | 11/1929 | Johnston | 431/187 |
| 1,213,820 | 1/1917 | Bergman | 110/28 |
| 1,581,351 | 4/1926 | Kreisinger et al. | 110/28 |
| 3,100,461 | 8/1963 | Werner | 110/28 |
| 3,231,366 | 1/1966 | Schenck et al. | 75/34 X |

FOREIGN PATENTS OR APPLICATIONS 406,487  11/1943  Italy...................................75/33

Primary Examiner—Henry W. Tarring, II
Attorney—Burgess, Dinklage & Sprung

[57] ABSTRACT

Process for production of sponge iron by direct reduction of iron ore wherein iron ore admixed with a carbonaceous reducing agent is passed through a rotary kiln countercurrent to a gas stream, and wherein granular coking high volatile coal is injected co-current to said gas stream as a solid reducing agent by means of oxygen containing gases through an inlet pipe, and said solid reducing agent becomes admixed with the iron ore, and travels countercurrent to said gas stream through the kiln. The process includes the characterizing step of passing gas over the outside of said inlet pipe cocurrent with said injected granular coal and into the kiln. This effects cooling of the inlet pipe, and reduces the tendency of the coal to form a cake on the inlet pipe.

2 Claims, 2 Drawing Figures

AIR SPEED:
A - 12 M/SEC.
B - 20 "
C - 27 "

INVENTOR
GÜNTER HEITMANN

PROCESS FOR PRODUCTION OF SPONGE IRON

This application is a continuation of application Ser. No. 525,452 filed Feb. 7, 1966, now abandoned.

Various processes for producing sponge iron are known. In these processes, iron ore or iron ore concentrates are charged in the form of lumps, fine particles or pellets in a mixture with a solid or fixed carbonaceous reducing agent, such as anthracite or coke, and if desired a sulfur-combining admixture such as lime or dolomite, to a rotary kiln, in which the charge is treated with hot gases flowing in a countercurrent so that the oxide of iron is reduced to metallic iron by the action of the reducing gases and/or the admixed solid carbon. It is also known that the direct reduction of oxidic iron ore, or concentrates thereof, in the rotary kiln is most suitably effected by maintaining with the aid of burners, which are mounted on the shell of the kiln, a uniform temperature, which is as closely as possible below the softening temperature, throughout a considerable part of the length of the kiln. The hot gases are usually produced by a central burner, which is mounted at the discharge end of the kiln and which in the known processes may consist of a pulverized coal burner and is fed with pulverized bituminous coal.

In other known processes, this reduction of iron ore in the rotary kiln is combined with a coking or slagging with bituminous coal so that a lump product or so-called ore coke is obtained, in which the highly reduced lumps of ore are held together by the low-temperature coke in larger lumps. It is further known to blow bituminous coal in large lumps, e.g., from ½ to 1 inch, with the aid of an air blast into the rotary kiln from the discharge end of the latter. In all known processes, the kiln charge must contain a considerable surplus of solid carbonaceous reducing agents relative to the amount which is theoretically required for a complete reduction if a trouble-free operation is to be ensured. For this reason, the surplus fuel contained in the matter which is discharged from the kiln must be separated from the discharged product and returned to the kiln. Where bituminous coals are used, they are suitably charged into the furnace at a point which is sufficiently spaced from the discharge end so that a complete low-temperature carbonization is ensured.

In the known processes the amount of bituminous coal which can be blown into the kiln is limited by the fact that depending on its caking properties this coal cakes sooner or later to the feed pipe so that the same is clogged.

The present invention provides an improvement in said known processes and enables even coal having a high tendency to cake and a high gas content to be blown into the kiln at any desired rate from the discharge end of the kiln and further minimizes and in many cases eliminates the need for a supply of fuel to the shell burners required for temperature control. According to the invention, it is also possible to produce from caking and/or gassing coal much more low-temperature coke than is consumed in the process itself, so that this coke may be used for other purposes.

The invention resides essentially in that the carrier gas is divided, only one part of it is injected in the form of a coal-air suspension, and the other part is injected into the kiln in the form of pure air or another oxygen-containing gas, without an admixture of coal. The coal-air suspension is injected into the kiln through the core duct of a pair of coaxial tubes and only gas is injected through the annulus between the two tubes. This gas has such a strong cooling action on the tube through which the coal-air suspension is supplied that caking is reliably avoided even when coal is used which has a very high tendency to cake. As caking may begin at about 400° C., the wall temperature of the inner tube is suitably held below this critical value. A heating fluid, such as a heating gas or heating oil, may be injected through this injecting tube when the furnace kiln is to be started up. For this purpose a third coaxial tube is suitably introduced, which serves only for injecting liquid fuel during starting up.

Thus, the invention provides a process for producing sponge iron by direct reduction of iron ore wherein iron ore admixed with a carbonaceous reducing agent is passed through a rotary kiln countercurrent to a gas stream. The gas stream is generated by a mixture of oxygen-containing gas and a caking coal injected into the kiln from a suspension inlet pipe. According to the invention, a gas is passed over the outside of the suspension inlet pipe co-current with the flow of said mixture, and into the kiln.

The bituminous coal to be injected is suitably charged in an unscreened condition so that it has no pronounced lower particle size limit. The upper particle size limit depends on the degree to which the coal disintegrates during low-temperature carbonization. The coal is suitably charged in such a particle size that the low-temperature coke is mainly obtained in a particle size below 10 millimeters.

As to the ratio of carrier gas (gas in the suspension) to coal, 1 to 3, particularly 1.5 to 2 cubic meters of gas, are preferably charged per kilogram of coal. The ratio of carrier gas to coal is dependent upon the oxygen content as well as the temperature of the carrier gas. In any case, the total rate of air or other oxygen-containing gas is selected in dependence on the amount of volatile constituents in the coal in such a manner that an atmosphere which is at least neutral and preferably reducing is maintained at the discharge end of the kiln. In this connection, the term neutral is not restricted to atmospheres which are nonoxidizing with respect to the sponge iron at the local temperature because the surplus of carbon which is present substantially protects the sponge iron from reoxidation. The term neutral is used to describe an atmosphere which contains no free oxygen on an average of the gas, in the region of the reducing and low-temperature carbonizing.

After low-temperature carbonization, the surplus fuel may be separated by known methods from the matter which has been discharged from the product and may be added entirely on in part to the charge mixture. Depending on the ratio of the rate at which bituminous coal is injected into the kiln to the rate at which iron ore is charged to the kiln, the contents of surplus carbonized fuel in the matter discharged from the kiln may be selected so that this content is just sufficient for meeting the demand of carbonized fuel to be returned to the charging end of the kiln, or is larger than said demand so that the surplus may be used for other purposes. The volatile constituents removed by low-temperature carbonization may be used to reduce or replace the fuel required for the shell burners if oxygen-containing gases are fed into the kiln atmosphere through these shell burners at a higher rate and the volatile constituents are used for a controlled local combustion.

The coal lumps are preferably injected into the kiln at a velocity of at least 10 meters per second, particularly 15–20 meters per second.

Apparatus suitable for the invention is shown in the accompanying drawing, wherein.

Figure 1:
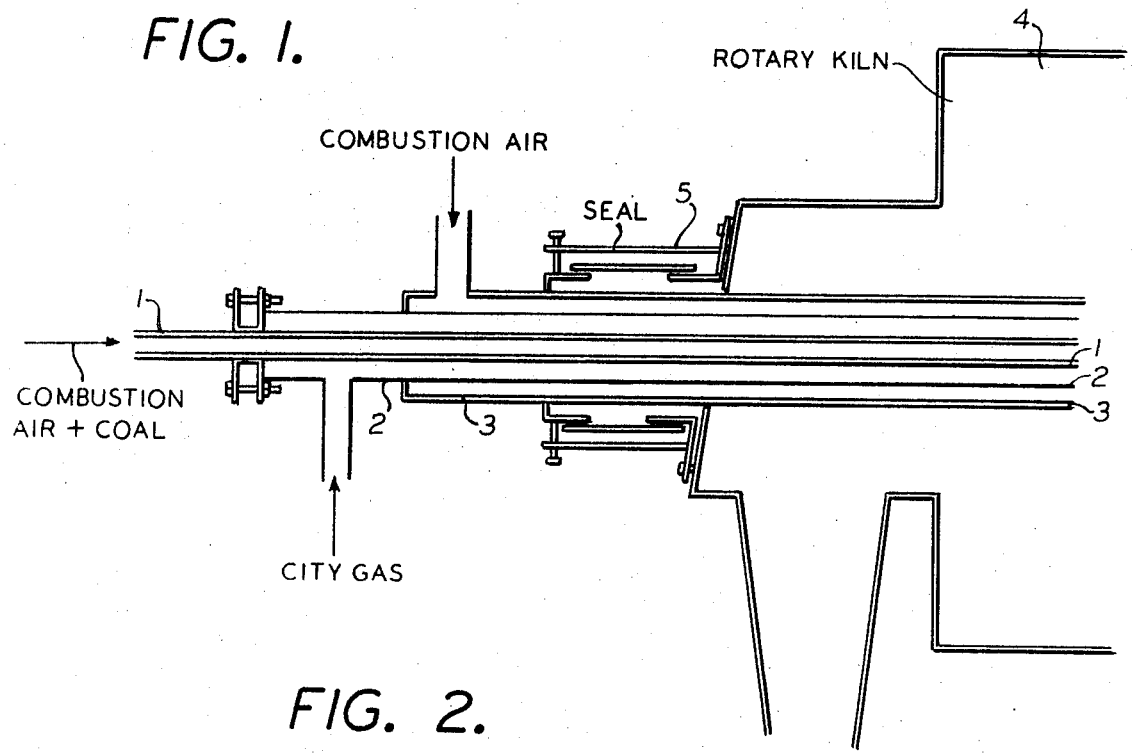
FIG. 1 is a schematic cross-section of the suspension inlet pipe and the powder pipe therefor, located at the sponge iron discharge end of the kiln.

The device virtually consists of three co-axial pipes fitted into each other. Coal is injected with oxygen-containing gases as carrier gas through the inner pipe 1, town gas through the central pipe 2 and combustion air simultaneously being destined to cool the injection system through the outer pipe 3. The central pipe 2 is sliding so that in dependence on its length it can be introduced at any desired depth into the kiln 4. Furthermore it can be replaced by pipes of a different but smaller diameter than that of the central pipe. The whole device is movably connected through a seal 5 to the kiln head so that referred to the kiln axis it can be inclined at any angle whatsoever.

This device permits a pneumatic feeding of coal into the rotary kiln and its distribution over the surface of the kiln charge at a great length of the rotary kiln. The trajectory for every individual grain size (e.g., 6–8 mm) is determined by a. the velocity of the carrier gas and/or
b. the slope of the injection device referred to the kiln axis;

consequently the distribution of the coal over the kiln length depends on the particle size distribution of the coal in connection with the aforesaid parameters.

General remarks:

The wider is the grain size range of the coal, the the wider the coal is spread over the surface of the kiln charge referred to the kiln length since the coarser coal particles are carried farther into the kiln than the finer ones.

Figure 2:
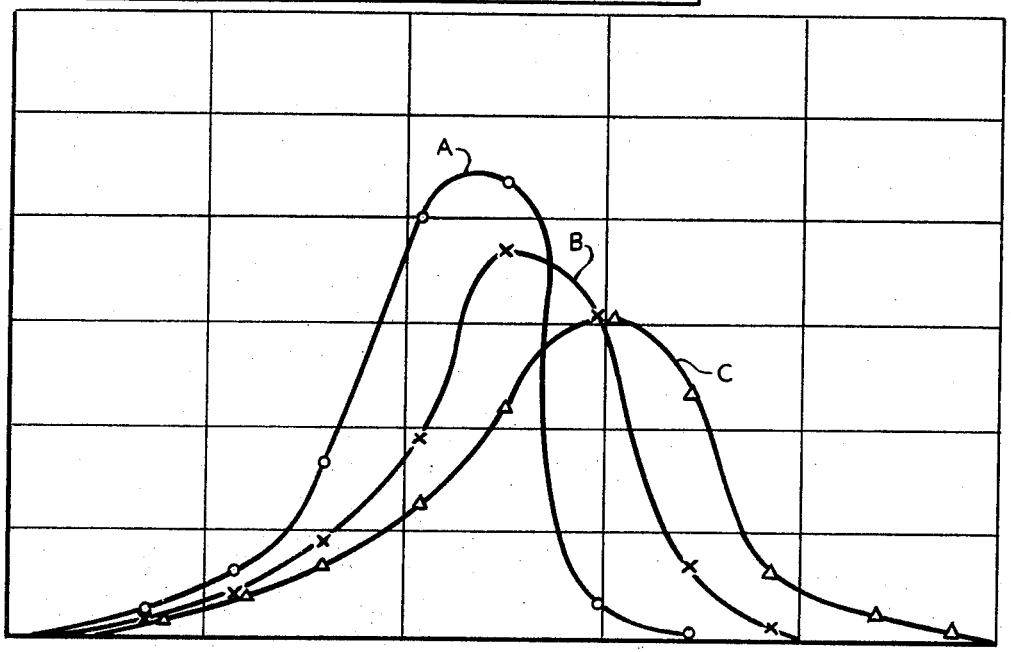
FIG. 2 is a diagram to show the quantitative distribution of coal over the kiln length depending on air speed.

FIG. 2 shows the distribution of coal with a grain size from 1 to 10 mm over the kiln length at three different velocities of the carrier gas in the injection pipe (12, 20, and 27 m/sec). This diagram clearly illustrates the increasing trajectory length of the coal with rising velocity of the carrier gas in the injection pipe and the distribution of the coal over a greater length of the kiln resulting therefrom.

Coal and/or carrier gas can be preheated before their charging into the rotary kiln.

The process according to the invention is described with particular reference to the following examples.

All iron ore reduction tests were carried out with solid, particularly with high-volatile reducing agents, which are described in the example given below, in a rotary kiln of 7.8 m length and 0.5 m inside diameter. The kiln was equipped with six shell burners through which gas and air were supplied to the kiln for controlling the temperatures. The shell burners were designed as angular burners and their openings were directed to the discharge end of the rotary kiln and the above described device installed in the kiln head at the discharge end of the rotary kiln served as final burner and simultaneously renders the pneumatic charging of reduction coal possible.

EXAMPLE 1

The following materials were charged at the feed end of an operating rotary kiln in the usual manner:

90 kg/h fired iron ore pellets of 10–15 mm grain size with an iron content of 66.5 percent
18 kg/h return coal minus 10 mm and
3.6 kg/h dolomite 0.1–1 mm From the discharge end of the kiln 50 kg/h of high-volatile hard lignite minus 10 mm were injected into the kiln. Air was used as carrier gas. The air velocity in the injection pipe was 12 m/sec. The injection pipe was aligned in parallel to the kiln axis.

The coal analysis was as follows:
| | |
|---|---|
| moisture | 16.7 % |
| ash (775° C) | 6.2 % |
| fixed carbon | 39.6 % |
| volatile matter | 37.5 % |
| gross calorific value | 5610 kcal/kg |
| free swelling index | 0 |

The volatile matter liberated during the charring of the coal was burnt by air supplied through the shell burners and the temperature in the reduction zone was thus maintained at 1,100° C. In this case a gas supply for controlling the temperature was unnecessary. Five cu.m./h (N.T.P.) town gas with a calorific value of approx. 4,000 kcal/cu.m. at N.T.P. was only fed through the final burner. The kiln discharge was cooled in a cooling drum to temperatures of below 100° C, the reduced ore was separated from the excessive coal by screening and magnetic separation and the excessive coal was recirculated through the feed end into the kiln.

The sponge iron pellets contained 92 percent total Fe, 91% Fe met. and 0.01% S. They were thus metallized at a degree of about 99 percent.

EXAMPLE 2

In this test 50 kg/h bituminous coal of the following composition was, instead of lignite, pneumatically charged into the rotary kiln:

| | |
|---|---|
| moisture | 3.25 wt.% |
| ash | 4.59 " |
| fixed carbon | 56.31 " |
| volatile matter | 35.86 " |
| gross calorific value | 7736 kcal/kg |
| free swelling index | 4.5 |

At the kiln feed end were charged:
| | |
|---|---|
| 102 kg/h | green pellets |
| 25 " | return coal |
| 3.6 " | dolomite |

The green pellets were formed from magnetite concentrate with 68.5% Fe tot. after mixing with 0.5 percent bentonite by single rolling on a pelletizing disk and addition of atomized water. When the green pellets were charged they contained about 8% $H_2O$.

The nozzle of the final burner with the coal injection pipe was somewhat raised so that the burner was located at an angle of 3° referred to the kiln axis. The gas velocity in the injection pipe was 20 m/sec.

Due to the low moisture content of this coal it was possible to maintain the temperature inside the rotary kiln merely by combustion of the expelled volatile constituents of the coal without any gas supply through the final burner or shell burners.

The charred excessive coal contained in the kiln discharge was, as described in test 1, separated from the reduced ore and recirculated into the kiln.

In spite of the caking properties of the coal no oversize in the form of agglomerates between coal and coal or between coal and ore particles was observed in the charred product.

The reduced pellets contained 92.5% Fe tot, 90.5% Fe met and 0.015% S.

EXAMPLE 3

As in test 2 were fed into the rotary kiln:

| | |
|---|---|
| 102 kg/h | green pellets |
| 25 " | return coal and |
| 3.6 " | dolomite |

The pellets had the same composition as in test 2.

From the discharge end of the kiln approx. 51 kg/h highly caking coal was injected by means of the pneumatic feeding device. This coal had the following composition:

| | | |
|---|---|---|
| moisture | 2.78 | wt.% |
| ash | 5.82 | " |
| volatile matter | 17.40 | " |
| fixed carbon | 73.99 | " |
| calorific value | 7720 | kcal/kg |
| sulphur | 0.72 | wt.% |
| free swelling index | 8 | |

The injected coal had a maximum grain size of 12 mm. The angle of inclination of the injection pipe referred to the kiln axis was 4°. A mixture of kiln waste gas and air (ratio 1:1) was used as carrier gas and had a temperature of 300° C. Its velocity in the injection pipe was approx. 25 m/sec. The coal concentration of the gas-coal suspension was 1 kg coal/cu.m carrier gas.

This higher velocity was chosen to achieve a still better distribution of the highly caking coal and thus to prevent in any case the formation of agglomerates. For the same reason an angle of inclination of 4° instead of 3° was provided for and a wider grain size range selected. The supply of air for cooling and combustion through the outer pipe of the feeding device allowed to maintain such a low temperature in the inner pipe that the temperature range, in which the caking coal becomes plastic, was not reached.

After the reduction the metallization degree of the pellets exceeded 90 percent. Their sulphur content was 0.015 percent.

While the invention has been described with respect to particular embodiments thereof, it will be understood that these embodiments are merely representative and do not serve to define the limits of the invention.

What is claimed is:

1. In a process for directly reducing iron ore to sponge iron in a rotary kiln having an upper end and a lower discharge end wherein a mixture of solid iron ore and carbonaceous reducing agent is fed to the upper end of said kiln and passes downwardly in said kiln and wherein a reducing gas stream passes upwardly in said kiln countercurrent to said mixture of solids; the improvement which comprises pneumatically injecting solid granular, caking, high volatile containing coal in a direction co-current to the direction of passage of said gas stream through an inlet pipe, the coal being of mixed particle sizes up to about 12 mm and being injected at a rate of at least about 10 meters per second in about 1–3 cubic meters of air per kilogram of coal, the coal thus being distributed over at least about 3 meters of said kiln so that it is available for admixture with said iron ore containing mixture; admixing said solid granular caking coal with said mixture, and passing the entire solid mixture countercurrent to said gas stream under reducing conditions through said kiln; wherein gas is passed into said kiln about said inlet pipe under such conditions as to cool said inlet pipe thereby reducing the tendency of said granular caking coal to coke on said inlet pipe.

2. Process according to claim 1, wherein the inlet pipe is maintained at less than about 400° C. by said cooling.

* * * * *